(12) United States Patent
Nishimura (10) Patent No.: US 8,720,232 B2
(45) Date of Patent: May 13, 2014

(54) CONTINUOUS GLASS FILAMENTS MANUFACTURING EQUIPMENT

(75) Inventor: Akihiro Nishimura, Tokyo (JP)

(73) Assignee: OCV Intellectual Capital, LLC, Toledo, OH (US)

( * ) Notice: Subject to any disclaimer, the term of this patent is extended or adjusted under 35 U.S.C. 154(b) by 2232 days.

(21) Appl. No.: 10/333,732

(22) PCT Filed: May 23, 2002

(86) PCT No.: PCT/JP02/05017
§ 371 (c)(1),
(2), (4) Date: Jan. 27, 2003

(87) PCT Pub. No.: WO02/102731
PCT Pub. Date: Dec. 27, 2002

(65) Prior Publication Data
US 2003/0106342 A1 Jun. 12, 2003

(30) Foreign Application Priority Data
May 28, 2001 (JP) .................................. 2001-158839

(51) Int. Cl.
*C03B 37/02* (2006.01)

(52) U.S. Cl.
USPC ............................................. 65/512; 65/481

(58) Field of Classification Search
USPC .................................................. 65/512, 481
See application file for complete search history.

(56) References Cited

U.S. PATENT DOCUMENTS

| | | | | |
|---|---|---|---|---|
| 2,908,036 A | * | 10/1959 | Russell ............................. | 65/512 |
| 3,251,665 A | * | 5/1966 | Bour ................................. | 65/481 |
| 3,468,644 A | * | 9/1969 | Leaman ........................... | 65/512 |
| 3,695,858 A | * | 10/1972 | russell .............................. | 65/481 |
| 3,726,655 A | * | 4/1973 | mitcham .......................... | 65/481 |
| 3,746,525 A | * | 7/1973 | kasuga ............................. | 65/512 |
| 4,049,412 A | * | 9/1977 | Dent, Jr. et al. .................. | 65/481 |

(Continued)

FOREIGN PATENT DOCUMENTS

| JP | 89428/1988 | 4/1988 |
|---|---|---|
| JP | 74333/1990 | 5/1990 |

(Continued)

OTHER PUBLICATIONS

International Search Report from PCT/JP02/05017 dated Aug. 27, 2002, 2 pages.

(Continued)

*Primary Examiner* — Joseph S Del Sole
(74) *Attorney, Agent, or Firm* — Calfee, Halter & Griswold LLP (57) ABSTRACT

An apparatus is provided for producing continuous glass filaments by spinning molten glass through nozzles of a bushing and cooling the thus-spun filaments with fins joined to one or more cooled manifolds and arranged in a proximity of the nozzles. Each manifold is provided at at least three locations thereof with at least one inlet port and at least one outlet port for coolant, respectively, with a proviso that the total number of the inlet and outlet ports is the same as the number of the locations of the manifold. Without using a complex construction, this invention makes it possible to provide the fins with improved durability and to produce the glass filaments with improved quality. In particular, the present invention can be applied to large bushings each of which is equipped with a number of nozzles.

19 Claims, 7 Drawing Sheets

(56) References Cited

U.S. PATENT DOCUMENTS

| | | | | |
|---|---|---|---|---|
| 4,330,311 A | * | 5/1982 | Jensen | 65/498 |
| 4,332,602 A | * | 6/1982 | Jensen | 65/498 |
| 4,566,890 A | * | 1/1986 | Hostler et al. | 65/512 |
| 5,846,285 A | | 12/1998 | Srinivasan et al. | |
| 6,408,654 B1 | * | 6/2002 | Boessneck et al. | 65/434 |

FOREIGN PATENT DOCUMENTS

| | | |
|---|---|---|
| JP | 6-053591 | 7/1994 |
| WO | 97/44287 | 11/1997 |
| WO | 02/102731 | 12/2002 |

OTHER PUBLICATIONS

Office action from European Application No. 02730701.6 dated Oct. 14, 2011, 4 pages.
Office action from European Application No. 02730701.6 dated Mar. 6, 2012, 4 pages.
Search Report from European Application No. 02703701.6 dated Apr. 26, 2011, 3 pages.
English translation of relevant portions of Office action from Japanese Application No. 2001-158839 dated Jul. 19, 2011, 1 page.
Office action from Chinese Application No. 02801894.X dated Oct. 15, 2004, 6 pages.

* cited by examiner

CONTINUOUS GLASS FILAMENTS MANUFACTURING EQUIPMENT

FIELD OF THE INVENTION

This invention relates to an apparatus for producing continuous glass filaments by cooling filaments of molten glass while drawing them out of individual nozzles of a bushing.

DESCRIPTION OF THE BACKGROUND

Figure 1:
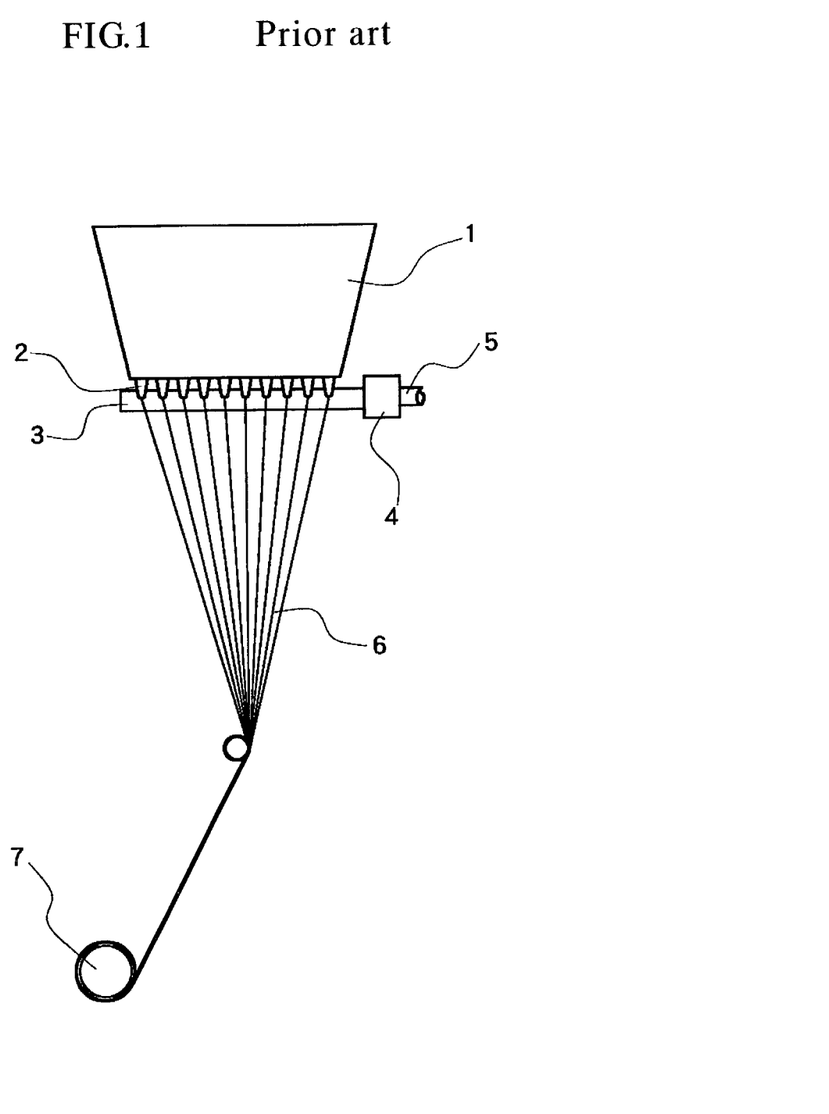
FIG. 1 is a side view of a continuous glass filament production apparatus, to which the present invention can be applied.

As illustrated in FIG. 1, a process has long been used to produce glass filaments 6 by introducing molten glass into a bushing 1, drawing the molten glass through numerous nozzles 2 arranged on the bushing 1, cooling the resulting filaments of the molten glass, and then gathering and taking up the thus-formed glass filaments on a winding roll 7.

Figure 7:
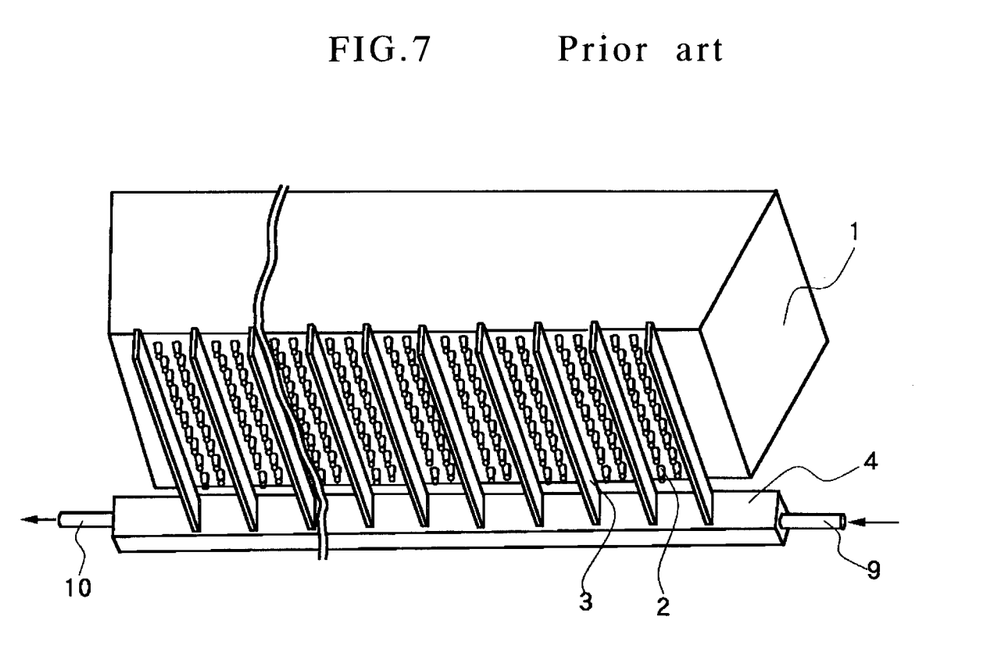
FIG. 7 is a fragmentary perspective view of a conventional continuous glass filament production apparatus.

As a method for effecting the cooling, it is known to arrange cooled fins 3 in proximity with the numerous nozzles 2 arranged on the bushing 1 such that the filaments of the high-temperature molten glass are solidified shortly after their melt-spinning through the nozzles 2. As shown in FIG. 7, for example, JP-B-06053591 discloses a method that coolant is introduced through an inlet port of a header (manifold) 4, is caused to pass through the header 4, and is then discharged through an outlet port 10.

With the method disclosed in the above-cited patent publication, however, the coolant, as shown in FIG. 7, is introduced through the inlet port 9 arranged at a single position of the manifold 4 and, after the coolant is caused to pass through a hollow section of the manifold 4 and hence to flow in a direction through the hollow section of the manifold 4, the coolant is discharged through the outlet port 10. As the fins 3 and manifold 4 have been rendered hot by heat from the bushing 1, the temperature of the coolant tends to rise until it reaches the outlet port 10. A difference is, therefore, developed in temperature between the coolant at the inlet port 9 and that around the outlet port 10. Due to this temperature difference and other causes, the fins 3 joined to the manifold 4 tend to become uneven in temperature and hence, are accompanied by problems such that the fins may undergo deteriorations by separation of an anti-corrosive plating applied to the fins 3 and the fins 3 may become uneven in cooling capacity to make the temperature profile of the bushing 1 uneven.

The following measures may be contemplated to overcome the above-described problems.

(1) By increasing the flow rate of coolant to have more heat absorbed by the fins 3, the temperature difference between the inlet port 9 and the outlet port 10 can be decreased. There is, however, a limitation to the flow rate of coolant which can be allowed to flow in a direction so that deteriorations of the fin 3 still cannot be avoided. Accordingly, the temperature profile of the bushing 1 becomes uneven, and the resulting glass filaments involve problems such that they vary in diameter, are prone to breakage, and may be lowered in production yield. To increase the flow rate of coolant in a direction, it is necessary to increase the diameter of the hollow section of the manifold 4. This naturally necessitates making the manifold 4 bigger, leading to problems in that a higher material cost is required and the convenience of assembly such as attachment is lowered.

(2) By lowering the temperature of coolant, a relatively efficient cooling effect can be obtained because the temperature of the coolant remains low throughout the hollow section of the manifold 4, although a temperature difference still occurs between the inlet port 9 and the outlet port 10. This measure, however, requires a cooling apparatus, and is accompanied by problems such that a higher initial cost is required and more complex production facilities are needed.

(2) By lowering the temperature of coolant, a relatively efficient cooling effect can be obtained because the temperature of the coolant remains low throughout the hollow section of the manifold 4, although a temperature difference still occurs between the inlet port 9 and the outlet port 10. This measure, however, requires a cooling apparatus, and is accompanied by problems that a higher initial cost is required and more complex production facilities are needed.

(3) By increasing the thickness of the fins 3, the progress of their corrosion can be retarded. This measure, however, involves a problem that the machinability of the fins, such as angle adjustability of the fins 3 in a gathering direction of filaments, is reduced.

(4) By decreasing the length of the fins 3, the progress of their corrosion can also be retarded. Heat absorption, however, is proportional to the length of the fins 3, so that the number of nozzles 2 which can be arranged must be determined depending upon the length of the fins 3. Therefore, the use of shorter fins leads to a need for decreasing the number of nozzles 2, and is not preferred.

(5) If the manifold 4 is divided to provide the bushing 1 with many manifolds 4, a relatively efficient cooling effect can be brought about. This measure, however, involves problems in that a higher initial cost is required and more complex production facilities are needed. Further, use of many manifolds 4 requires to leave spaces between individual manifold-fins units. This, however, naturally requires a reduction in the number of nozzles, leading to a problem that the efficiency of production of glass filaments is lowered.

With the above-described problems in view, the present invention, therefore, has as a primary object the provision of an apparatus for producing continuous glass filaments, which without using a complex construction, can provide fins with improved durability, can produce glass filaments with improved quality, and can be applied especially to a large bushing having many nozzles.

SUMMARY OF THE INVENTION

To achieve the above-described object, the present invention provides an apparatus for producing continuous glass filaments by spinning molten glass through nozzles of a bushing and cooling the thus-spun filaments with fins joined to at least one cooled manifold and arranged in the proximity of said nozzles, wherein the manifold is provided at at least three locations thereof with at least one inlet port and at least one outlet port for coolant, respectively, with a proviso that the total number of the inlet and outlet ports is the same as the number of the locations of the manifold.

According to the present invention, each manifold is provided at at least three locations thereof with at least one inlet port and at least one outlet port for coolant, respectively, with the proviso that the total number of the inlet and outlet ports is the same as the number of the locations of the manifold. This has made it possible to reduce the temperature difference between the coolant inlet port(s) and the coolant outlet port(s), to improve the cooling efficiency of the manifold, to improve the cooling effect of the fins and also to reduce deteriorations of the fins. The present invention, therefore, can provide glass filaments with stable quality to achieve an improved production yield and also, can decrease the frequency of fin replacements.

BEST MODES FOR CARRYING OUT THE INVENTION

As illustrated in FIG. 7, the conventional continuous glass filament production apparatus comprises a bushing 1, a manifold 4, and a plurality of fins 3. The fins 3 are joined to the manifold 4 such that the fins 3 extend at right angles relative to the manifold 4. The fins 3 are arranged in each of the second spaces between the rows of nozzles 2 on the bushing 1. The manifold 4 is a guide tube for coolant, and the coolant is introduced from an end portion 9 of the manifold 4 and discharged from an opposite end portion 10 of the manifold 4 and therefore, is re-circulated and re-used to cool the fins 3.

Figure 2:
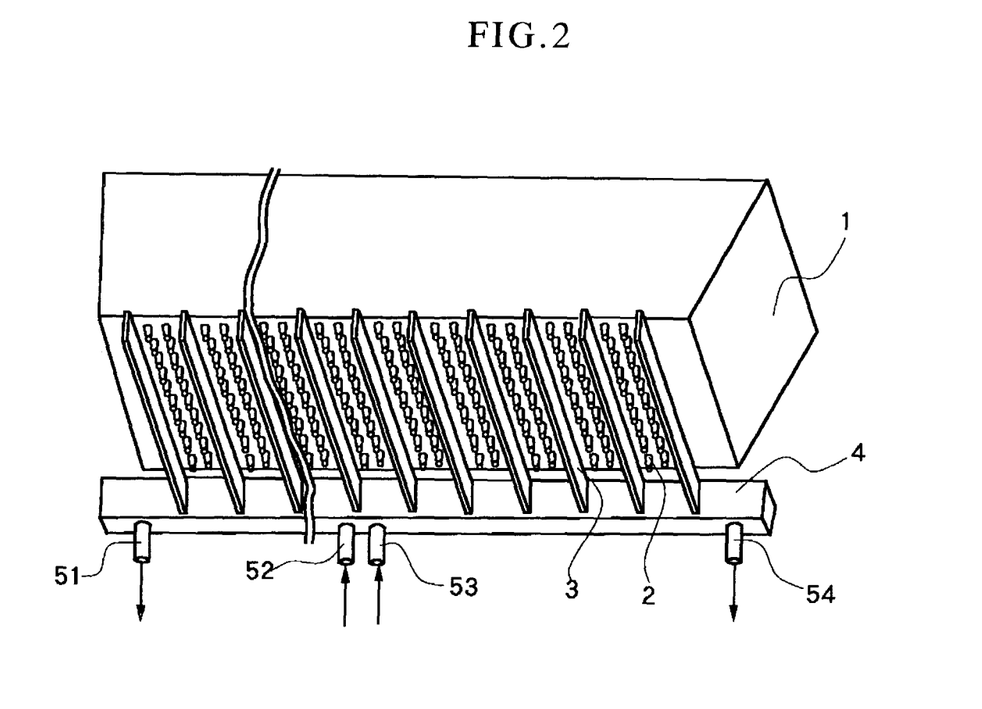
FIG. 2 is a fragmentary perspective view of a continuous glass filament production apparatus according to one embodiment of the present invention, and corresponds to a view of the apparatus of FIG. 1 as seen from a lower point thereof.
Figure 3:
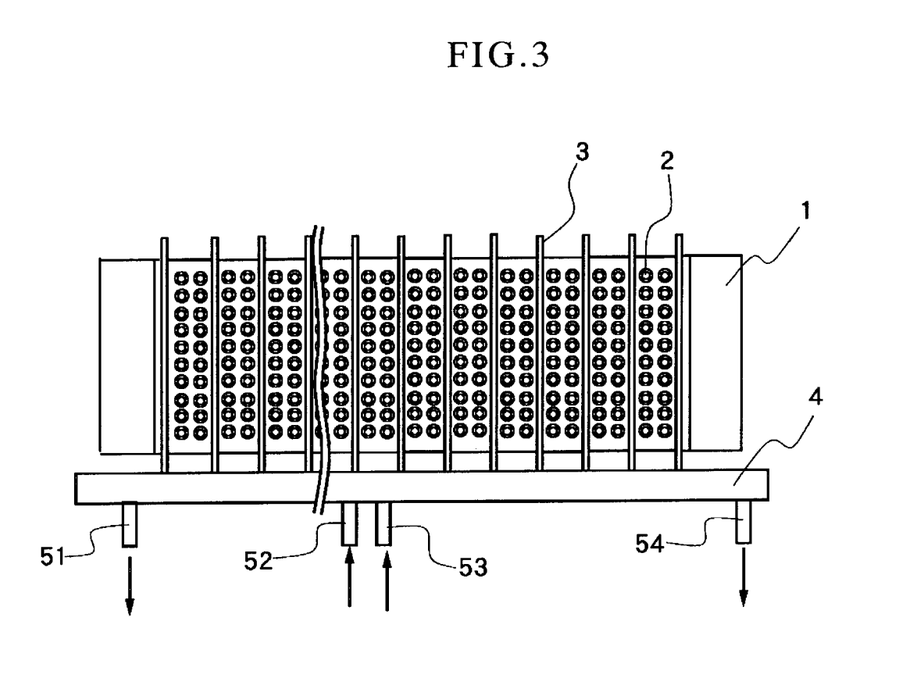
FIG. 3 is a fragmentary bottom view of the apparatus of FIG. 2.

The present invention is characterized in that in the above-described conventional apparatus for the production of continuous glass filaments, coolant inlet/outlet ports 5 are arranged at at least three locations in total per each manifold 4. It is to be noted that coolant inlet port(s) and coolant outlet port(s) are designated by the same reference numeral because whether a port is used as an inlet port or as an outlet port is determined depending upon the direction of introduction of coolant. In the embodiment of the present invention as illustrated in FIGS. 2 and 3, coolant inlet/outlet ports 51, 52, 53, 54 are elongated tubes connected at at least four locations in total to the manifold 4, through which the coolant is caused to flow, in this order along the length of the manifold 4. At least three of the ports 51, 52, 53, and 54 are thus in fluid communication with the coolant and hence in fluid communication with each other.

Introduction of the coolant is effected through the ports 52, 53 (as indicated by arrows), while discharge of the coolant is effected through the ports 51, 54 (as indicated by arrows). Whether the coolant is being introduced or discharged, the ports 51, 52 53 54 thus admit or receive the coolant flowing to or from the manifold 4. To reduce the residence time of the coolant in the manifold 4 and hence to enhance the cooling effect, it is preferred to introduce the coolant through the ports 52, 53 and to discharge it through the outlet ports 51, 54 at the two locations. It is to be noted that, although the ports 52, 53 are drawn as two separate ports, they should be considered to be an inlet port arranged at a single location because they are located close to each other.

Figure 4:
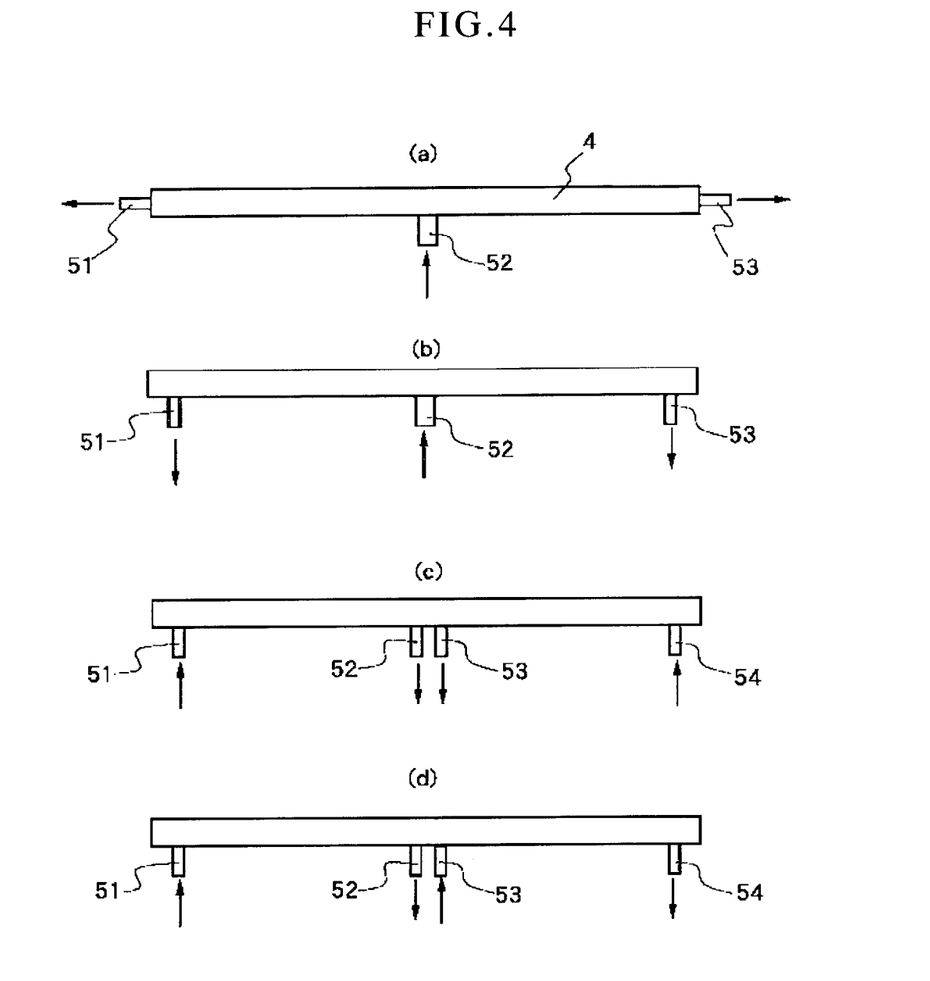
FIGS. 4(a) through 4(d) are simplified schematic side views showing manifolds and coolant inlet and outlet ports of continuous glass filament production apparatuses according to other embodiments of the present invention, respectively.

Referring next to FIGS. 4(a) through 4(d), a description will be made of the continuous glass filament production apparatuses according to other embodiments of the present invention. In each of these drawings, only a manifold 4 and its associated coolant inlet/outlet ports are shown. A flow of the coolant through each port is indicated by an arrow. In the embodiment shown in FIG. 4(a), a conventional manifold 4 is provided at an approximately central location thereof with an additional inlet port 52, and the coolant is discharged through outlet ports 51,53 arranged at opposite ends of the manifold 4. The embodiment depicted in FIG. 4(b) is similar to the embodiment shown in FIG. 4(a), but is different from the embodiment of FIG. 4(a) in that outlet ports 51, 53 are arranged perpendicularly with respect to the manifold 4. The embodiment illustrated in FIG. 4(c) is similar to the embodiment shown in FIGS. 2 and 3, but is different from the embodiment of FIGS. 2 and 3 in that the introduction of the coolant and the discharge of the coolant are rendered opposite (the ports 52,53 should be considered to be an outlet port arranged at a single location because they are located close to each other, although the ports 52,53 are drawn as two separate ports). The embodiment depicted in FIG. 4(d) is similar to the embodiment shown in FIGS. 2 and 3, but is different from the embodiment of FIGS. 2 and 3 in that introduction of the coolant is effected through the ports 51, 53 and discharge of the coolant is effected through the ports 52, 54. It should be noted that a partition wall is arranged within the hollow section of the manifold at a position between the outlet port 52 and the inlet port 53, although the partition wall is not shown in FIG. 4(d). This partition wall serves to prevent the coolant, which has become warmer and should be discharged through the outlet inlet port 52, and the coolant, which has been introduced through the inlet port 53 and is still cold, from mixing with each other.

Owing to the arrangement of coolant inlet/outlet ports at at least three locations in total per each manifold 4 as described above, the present invention can bring about the above-described advantageous effects. Embodiments each equipped with a coolant inlet port practically at one location of the manifold 4 and outlet ports at two or more locations, respectively, of the manifold 4, specifically the constructions shown in FIGS. 2 and 3, FIG. 4(a) and FIG. 4(b) are preferred, because the flow of coolant through the manifold 4 becomes uniform and the fins 3 can be efficiently cooled. More preferred embodiments are those each equipped with coolant inlet ports at two or more locations, respectively, of the manifold 4 and a coolant outlet port practically at one location of the manifold 4, specifically the embodiment of FIG. 4(c).

Figure 5:
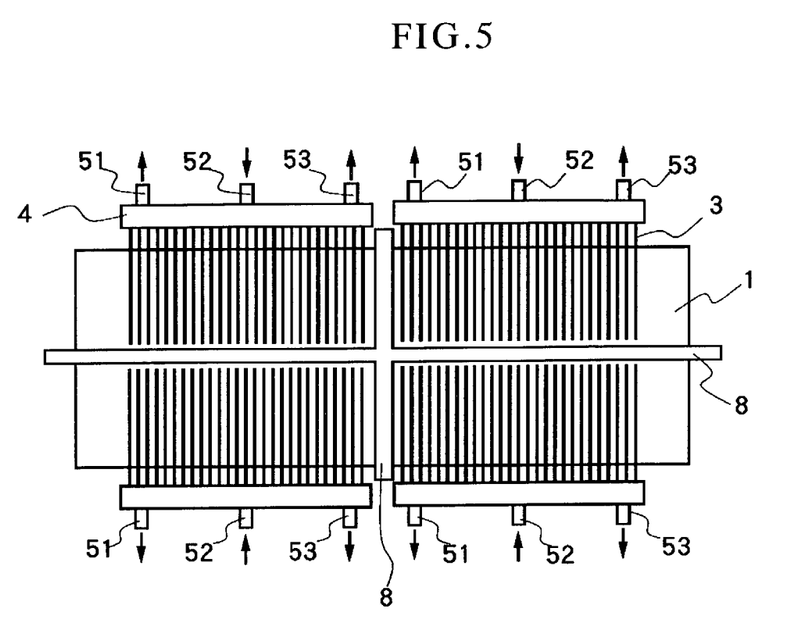
FIG. 5 is a fragmentary bottom view showing a continuous glass filament production apparatus according to a still further embodiment of the present invention.
Figure 6:
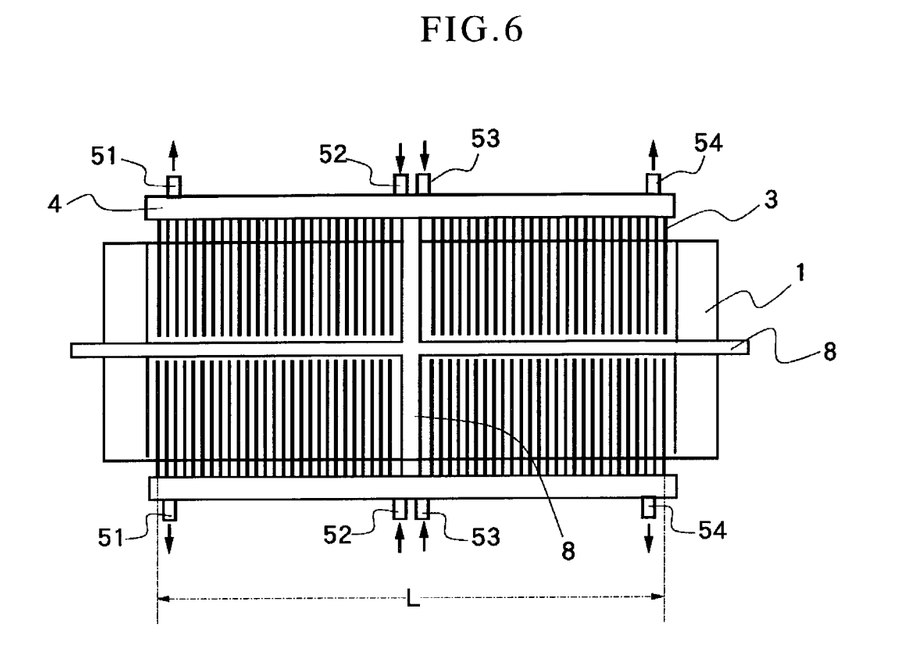
FIG. 6 is a fragmentary bottom view showing a continuous glass filament production apparatus according to a yet further embodiment of the present invention.

Reference is next had to FIG. 5 to describe the still further embodiment of the present invention. FIG. 5 is a view of a bushing 1, manifolds 4 and fins as seen from a lower point. Support bars 8,8 are arranged on a lower part of the bushing 1 to prevent the formation of molten glass into filaments from becoming unstable due to flexion of the bushing 4 under the weight of the molten glass. As the support bars 8, 8 are arranged, rows of nozzles (not shown) arranged on the bushing 1 are divided into 4 blocks. Each block is provided with its own manifold 4, and fins 3 joined to the manifold 4 are arranged in all second ones of spaces between the rows of associated nozzles. In the continuous glass filament production apparatus according to the yet further embodiment as illustrated in FIG. 6, each pair of adjacent blocks located side by side are provided with a single continuous manifold 4. Needless to say, the coolant inlet/outlet ports 51-54 arranged on the manifolds 4 in FIGS. 5 and 6 can be arranged in various combinations as illustrated in FIGS. 4(a) through 4(d) without being limited to the combinations illustrated in FIGS. 5 and 6.

In each apparatus according to the present invention, each manifold is required to cool its associated fins by introducing coolant through one or more inlet ports, allowing the coolant to pass through the hollow section of the manifold, and then discharging the coolant through one or more outlet ports, with the proviso that the total number of the inlet and outlet ports is three or more. In the present invention, no particular limitation is imposed on the arrangement of the manifolds. It is, however, preferred to arrange them along at least one side of a bushing by which molten glass is formed into filaments. Arrangement of manifolds along a longer side of a bushing makes it possible to bring the length of fins into conformity with the length of the bushing in the direction of its shorter side, so that the fins can be formed shorter to bring about an excellent cooling effect. It is, therefore, more preferred to arrange manifolds along a longer side of a bushing. Adoption of such a construction can avoid a complex design, and is preferred from the standpoint of cost.

As the material for the manifold(s), use of copper, silver or the like is preferred because the manifold(s) can be protected from deteriorations due to heat from the bushing and the cooling effect can be enhanced.

Examples of the coolant can include water, alcohol, ammonia, and liquefied nitrogen. Two or more of these coolants may be also used in combination. As use of water is generally preferred from the standpoint of cost, the coolant will hereinafter be called "cooling water". No particular limitation is imposed on the temperature of cooling water, but the temperature of cooling water may range preferably from 10 to 30° C., more preferably from 15 to 20° C.

No particular limitation is imposed on the flow rate of the cooling water through each manifold. In view of the size and weight of each manifold attached to a bushing, however, a flow rate of from 3.0 to 20 L/min is preferred. Since water is not caused to flow continuously in one direction, the present invention makes it possible to allow cooling water to flow at a flow rate about twice as much as the flow rate at which cooling water was caused to flow in one direction through a manifold of conventional size. It is, therefore, possible to cause cooling water to flow at a large flow rate of from 6.0 to 20 L/min. As a consequence, the manifold and fins can be cooled efficiently and fully.

As each manifold is increased neither in size nor in weight in the apparatus of the present invention, the manifold is excellent in its assembly convenience such as the convenience of its attachment to the bushing. A flow rate of cooling water through each manifold smaller than 3.0 L/min leads to a small cooling effect for the fins. A flow rate greater than 20 L/min, on the other hand, is not expected to bring about an additional cooling effect, but requires to increase the diameter of each inlet port for cooling water and also the diameter of the hollow section of the manifold so that the apparatus becomes greater. Such an excessively large flow rate is not preferred economically.

The manifold is equipped with a plurality of fins which extend at right angles relative to the manifold. The fins are arranged in the proximity of nozzles of the bushing, thereby making it possible to cool the spun molten glass. These fins can be arranged in all spaces between the rows of nozzles, although they were arranged in all second ones of spaces between the rows of nozzles in each of the above-described embodiments. As the fins, those of the commonly employed dimensions can be used. The fins may preferably range from 0.8 to 2.5 mm in thickness and from 15 to 30 mm in height. In length, on the other hand, the fins may preferably be 55 mm or longer.

As the material of the fins, it is possible to use one commonly employed. For example, copper, silver or the like can be used to facilitate conduction of heat to the water-cooled manifold. For protecting the fins from deteriorations under heat, it is preferred to apply coatings onto the fins by spraying nickel, vanadium, chromium or the like.

It is important for the manifold in the apparatus of the present invention to be provided at at least three locations thereof in total with cooling water inlet/outlet ports, respectively (per each manifold where more than one manifold is arranged). This feature makes it possible to cause the cooling water to flow in different directions through each manifold, to easily increase the flow rate of the cooling water through each manifold, and to cause the cooling water to flow over a short distance through each manifold. As a result, the temperature difference between each inlet port and its corresponding outlet port for the cooling water can be rendered smaller, leading to an improvement in the cooling effect of the fins.

When the manifold (each manifold where more than one manifold is arranged) is provided at at least three locations thereof in total with cooling water inlet/outlet ports, it is preferred to arrange a cooling water inlet port at practically one location and cooling water outlet ports at two or more locations, respectively. As illustrated in FIGS. 2 and 3, FIG. 4(a) and FIG. 4(b), for example, the use of the port 52 (or ports 52, 53), which is (are) arranged at practically one location, as an inlet port and the use of the ports 51,53 (or 51, 54), which are arranged at the opposite ends of the manifold 4, as outlet ports lead to a reduction in the temperature difference between the cooling water inlet port and the cooling water outlet ports, thereby making it possible to improve the cooling effect by the manifold 4, to improve the cooling effect of the fins 3, and also to prevent deteriorations of the manifold 4 and fins 3.

As shown in FIG. 4(c), the use of cooling water inlet ports at two locations (51, 54) or more and a cooling water outlet port at practically one location (52,53) in the manifold 4 also leads to a reduction in the temperature difference between the cooling water inlet ports and the cooling water outlet port so that the above-described cooling effect can be improved further. This arrangement makes it possible to obtain more uniform flows of cooling water than the above-described arrangement in which an inlet port is arranged at only one location. Heat which is a cause of deteriorations of the fins 3 can, therefore, be dissipated in a widely distributed manner, so that localized deteriorations of the fins 3 can be eliminated and hence, the service life of the fins 3 can be improved.

In the present invention, the apparatus may preferably satisfy the following equation:

$$105 \leq L/N \leq 330$$

wherein L represents a distance in mm between nozzles arranged corresponding to an end of a length of the bushing and nozzles arranged corresponding to an opposite end of the length of the bushing (see FIG. 6), and N represents the total number of the manifold(s) arranged for the bushing. An L/N ratio smaller than 105 can still achieve sufficient cooling, but requires to arrange many manifolds 4 for the bushing 1. As a result, the apparatus becomes complex. Moreover, spaces have to be left between adjacent manifolds 4. To permit providing the bushing 1 with the same number of nozzles, the bushing 1 must be enlarged. If the bushing 1 is conversely constructed in the same size, it is then necessary to reduce the number of nozzles 2. Use of nozzles in such an unduly smaller number is inferior in productivity, and is not preferred. An L/N ratio greater than 330, on the other hand, leads to inferior cooling capacity and is not preferred.

It is also preferred for the apparatus according to the present invention to satisfy the following equation:

$$26 \leq L/P \leq 210$$

wherein L represents said distance, and P represents the total number of the inlet and outlet ports for coolant arranged for said manifold which is alone arranged for the bushing, or for all said manifolds which are arranged for the bushing. An L/P ratio smaller than 26 can still achieve sufficient cooling, but more inlet ports or outlet ports have to be arranged to make the apparatus complex. An L/P ratio greater than 210, on the other hand, leads to inferior cooling capacity and is not preferred.

Further, the apparatus according to the present invention may preferably satisfy the following equation:

$$10 \leq M/W \leq 63$$

wherein M represents a length in mm of each manifold, and W represents a total flow rate in L (liter)/min of coolant through the manifold. An M/W ratio smaller than 10 can still achieve sufficient cooling, but the length of each manifold has to be shortened. As a result, the apparatus becomes complex. An M/W ratio greater than 63, on the other hand, leads to inferior cooling capacity and is not preferred.

It is also preferred for the apparatus according to the present invention to satisfy the following equation:

$$M/I \leq 12.0$$

wherein M represents a length in mm of each manifold, and I represents the total number of fins joined to the manifold. An M/I ratio greater than 12 results in a larger space between fins and their corresponding nozzles and hence, leads to a reduction in the cooling effect of the fins. Such an excessively large M/I ratio is therefore not preferred.

EXAMPLES

The present invention will next be described more specifically based on Examples and Comparative Examples.

Examples 1-5 and Comparative Examples 1-3

An apparatus of the following specification was provided:

| | |
|---|---|
| Number of nozzles per bushing: | 6,000 |
| Distance (L) between nozzles arranged corresponding to one end of the length of the bushing and nozzles arranged corresponding to the opposite end of the length of the bushing: | 630 mm |
| Number of manifolds: | 4 |
| Length of each manifold: | 320 mm |
| Number of fins per manifold: | 30 |
| Length of each fin: | 105 mm |
| Thickness of each fin: | 2.3 mm |

The injection rate of molten glass, the temperature of the bushing and the feed temperature of cooling water were set at 136 kg/hr, 1,243° C. and 17° C., respectively. The service life of the fins was determined when glass filaments were continuously produced under the above-described conditions while varying the number of cooling water inlet/outlet ports and the flow rate of the cooling water. The results are presented in Table 1.

TABLE 1

| Example/ Comp. Ex. | Numbers of inlet/outlet ports | Flow rate of cooling water (L/min) | Service life of fins (days) |
|---|---|---|---|
| Example 1 | Inlet ports: 2 Outlet port: 1 | 8.2 | 255 |
| Example 2 | Inlet port: 1 Outlet ports: 2 | 7.5 | 190 |
| Example 3 | Inlet ports: 2 Outlet port: 1 | 3.6 | 50 |

TABLE 1-continued

| Example/ Comp. Ex. | Numbers of inlet/outlet ports | Flow rate of cooling water (L/min) | Service life of fins (days) |
|---|---|---|---|
| Example 4 | Inlet port: 1 Outlet ports: 2 | 3.6 | 40 |
| Example 5 | Inlet ports: 2 Outlet port: 1 | 15 | 330 |
| Comparative Example 1 | Inlet port: 1 Outlet port: 1 | 3.6 | 33 |
| Comparative Example 2 | Inlet port: 1 Outlet port: 1 | 7.3 | 100 |
| Comparative Example 3 | Inlet port: 1 Outlet port: 1 | 15 | 148 |

In Table 1, the service life of the fins was expressed in terms of a time point at which the coating applied for the prevention of deterioration had separated from even one of the plural fins joined to the corresponding manifolds.

Comparisons will be made between the Examples and the Comparative Examples. Between Example 2 and Comparative Example 2 which were close to each other in the flow rate of cooling water, the service life of the fins was substantially improved in Example 2. A similar tendency is observed between Examples 3 and 4 and Comparative Example 1 all of which were the same in the flow rate of cooling water and also between Example 5 and Comparative Example 3 both of which were the same in the flow rate of cooling water. Comparing Examples 1, 3 and 5 in each of which two inlet ports and one outlet port were arranged with Examples 2 and 4 in each of which one inlet port and two outlet ports were arranged, the arrangement of two inlet ports and one outlet port is appreciated to be superior. Turning to the flow rate of cooling water, on the other hand, the greater the flow rate of cooling rate, obviously the more effective. In the case of Comparative Example 3, the greater flow rate of cooling water resulted in heavier manifold units, leading to inferior workability upon replacement of the fins.

INDUSTRIAL APPLICABILITY

According to the present invention as described above, the arrangement of coolant inlet/outlet ports at at least three locations in total per each manifold reduces the temperature difference between the coolant inlet port(s) and the coolant outlet port(s), and makes it possible to improve the cooling efficiency of the manifold, to improve the cooling effect of fins and further to reduce deteriorations of the fins. Therefore, glass filaments can be produced with stable quality to improve their production yield, and the frequency of fin replacements can be reduced.

This application claims the priority of Japanese Patent Application 2001-158839 filed May 28, 2001, which is incorporated herein by reference.

What is claimed is:

1. An apparatus for producing continuous glass filaments by spinning molten glass through nozzles of a bushing and cooling the thus-spun filaments, comprising:
   at least one cooled manifold; and
   fins joined to the at least one cooled manifold and arranged in a proximity of said nozzles,
   wherein said at least one manifold includes at least three ports in fluid communication with each other, at least one of the at least three ports is an inlet port for liquid coolant and at least one of the at least three ports is an outlet port for the liquid coolant from the inlet port, a total number of said inlet and outlet ports being the same as the number of the at least three ports, and wherein the at least one manifold is configured to have the liquid coolant flow into the at least one manifold exclusively through the at least one inlet port and flow out of the at least one manifold exclusively through the at least one outlet ports.

2. An apparatus according to claim 1, wherein said at least one manifold includes an inlet port and at least two outlet ports for the liquid coolant.

3. An apparatus according to claim 1, wherein said at least one manifold includes at least two inlet ports for the liquid coolant and at least one outlet port for the liquid coolant.

4. An apparatus according to claim 1, which satisfies the following equation:

$$105 \leq L/N \leq 330$$

wherein L represents a distance in mm between nozzles arranged corresponding to an end of a length of said bushing and nozzles arranged corresponding to an opposite end of said length of said bushing, and N represents the total number of said at least one manifold arranged for said bushing.

5. An apparatus according to claim 4, which satisfies the following equation:

$$26 \leq L/P \leq 210$$

wherein L represents said distance, and P represents the total number of said inlet and outlet ports for liquid coolant arranged for said at least one manifold.

6. An apparatus according to claim 1, wherein a total flow rate of liquid coolant through each manifold ranges from 6.0 to 20 L/min.

7. An apparatus according to claim 1, which satisfies the following equation:

$$10 \leq M/W \leq 63$$

wherein M represents a length in mm of all of said at least one manifold, and W represents a total flow rate in L/min of liquid coolant through all of said at least one manifold.

8. An apparatus according to claim 1, wherein said fins have a thickness of from 0.8 to 2.5 mm.

9. An apparatus according to claim 1, wherein said fins have a length of at least 55 mm.

10. An apparatus according to claim 1, which satisfies the following equation:

$$M/I \leq 12.0$$

wherein M represents a length in mm of each manifold, and I represents the total number of fins joined to said at least one manifold.

11. An apparatus for producing continuous glass filaments by spinning molten glass through nozzles of a bushing and cooling the thus-spun filaments, comprising:

at least one manifold cooled by a liquid coolant and having a first side;

fins adjacent the first side of the at least one manifold and arranged in a proximity of said nozzles, wherein said at least one manifold includes at least three ports proximate the first side in fluid communication with the liquid coolant, at least one of the at least three ports comprising an inlet port for the liquid coolant, and at least one of the at least three ports comprising an outlet port for discharging the liquid coolant from the inlet port.

12. An apparatus according to claim 11, wherein said at least one manifold includes an inlet port and at least two outlet ports for the liquid coolant.

13. An apparatus according to claim 11, wherein said at least one manifold includes at least two inlet ports and at least one outlet port for the liquid coolant.

14. The apparatus of claim 11, wherein each of the at least three ports comprises an elongated tube for introducing or discharging the liquid coolant to the manifold.

15. An apparatus for producing continuous glass filaments by spinning molten glass through nozzles of a bushing and cooling the thus-spun filaments, comprising:

at least one cooled manifold having a first side; and fins adjacent the first side of the at least one cooled manifold and arranged in a proximity of said nozzles, said at least one manifold including at least three means for receiving a liquid coolant for cooling said fins.

16. The apparatus of claim 15, wherein the at least three means for receiving the liquid coolant comprises:

means for introducing a second flow of the liquid coolant to the manifold; and means for introducing a second flow of the liquid coolant to the manifold; and means for discharging the liquid coolant received from one of the receiving means.

17. The apparatus of claim 15, wherein the at least three means for receiving the liquid coolant comprises:

means for introducing liquid coolant to the manifold;

first means for discharging liquid coolant received by the manifold from the introducing means; and second means for discharging liquid coolant from the manifold.

18. The apparatus of claim 16, wherein each means for introducing and means for discharging liquid coolant comprises a port through which the liquid coolant flows.

19. The apparatus of claim 15, wherein the manifold further includes at least four means for receiving the liquid coolant.

* * * * *